(12) United States Patent
John

(10) Patent No.: US 12,259,767 B2
(45) Date of Patent: Mar. 25, 2025

(54) INTEGRATED CIRCUIT PERFORMANCE ADAPTATION USING WORKLOAD PREDICTIONS

(71) Applicant: Advanced Micro Devices, Inc., Santa Clara, CA (US)

(72) Inventor: Julian Daniel John, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 96 days.

(21) Appl. No.: 18/180,778

(22) Filed: Mar. 8, 2023

(65) Prior Publication Data

US 2024/0302879 A1    Sep. 12, 2024

(51) Int. Cl.
*G06F 1/00*    (2006.01)
*G06F 1/26*    (2006.01)

(52) U.S. Cl.
CPC ........................................ *G06F 1/26* (2013.01)

(58) Field of Classification Search
None
See application file for complete search history.

(56) References Cited

U.S. PATENT DOCUMENTS

| | | | | |
|---|---|---|---|---|
| 2015/0301853 | A1* | 10/2015 | Nandyalam | G06F 9/46 718/105 |
| 2020/0142466 | A1* | 5/2020 | Naik | G06N 3/045 |
| 2021/0294403 | A1* | 9/2021 | Calugaru | G06N 3/044 |
| 2024/0168948 | A1* | 5/2024 | Zhu | G06F 11/3457 |

* cited by examiner

*Primary Examiner* — Nitin C Patel
(74) *Attorney, Agent, or Firm* — Kevin T. Cuenot

(57) ABSTRACT

Performance adaptation for an integrated circuit includes receiving, by a workload prediction system of a hardware processor, telemetry data for one or more systems of the hardware processor. A workload prediction is determined by processing the telemetry data through a workload prediction model executed by a workload prediction controller of the workload prediction system. A profile is selected, from a plurality of profiles, that matches the workload prediction. The selected profile specifies one or more operating parameters for the hardware processor. The selected profile is provided to a power management controller of the hardware processor for controlling an operational characteristic of the one or more systems.

20 Claims, 4 Drawing Sheets

308

| Application Class | Application | Operating State | Profile |
|---|---|---|---|
| Game | Game-1 | - | Profile-1 |
| Game | Game-2 | - | Profile-2 |
| Word Processor | WP-1 | - | Profile-3 |
| Word Processor | WP-2 | - | Profile-4 |
| Spreadsheet | SS-1 | - | Profile-5 |
| Spreadsheet | SS-2 | - | Profile-6 |
| Web-Conferencing | Web-Conferencing-1 | Web-Conferencing-1-OS-1 | Profile-7 |
| Web-Conferencing | Web-Conferencing-1 | Web-Conferencing-1-OS-2 | Profile-8 |
| Web-Conferencing | Web-Conferencing-2 | Web-Conferencing-2-OS-1 | Profile-9 |
| Browser | Browser-1 | - | Profile-10 |
| Browser | Browser-2 | - | Profile-11 |

FIG. 4

INTEGRATED CIRCUIT PERFORMANCE ADAPTATION USING WORKLOAD PREDICTIONS

TECHNICAL FIELD

This disclosure relates to integrated circuits (ICs) and, more particularly, to adapting performance of an IC based on workload predictions.

BACKGROUND

Many devices such as computer systems, appliances, communication devices, and the like include one or more hardware processors. A hardware processor refers to an integrated circuit (IC) that is capable of performing one or more tasks. Examples of hardware processors may include, but are not limited to, central processing units (CPU), graphics processing units (GPUs), programmable ICs such as a Field Programmable Gate Arrays (FPGAs), and System-on-Chips (SoCs). The complexity of the hardware processor may vary from architectures that include only a single core capable of executing computer program instructions, to multi-core architectures, and to more complex architectures including multiple cores and/or multiple systems such as Application Specific ICs and/or circuits capable of operating cooperatively with one another.

In the general case, the performance of a hardware processor is tuned based on anticipated workloads to be performed. The tuning is largely static in nature and does not vary with the particular workload being performed at any given time. That is, certain operating parameters such as voltage and frequency that influence the performance of the IC may be determined a priori based on anticipated workloads of the hardware processor. The operating parameters, being generally applicable across a variety of anticipated workloads, are not optimized with respect to any particular workload and remain statically in place as the hardware processor operates in the field.

In other cases, the hardware processor may be adapted to accommodate a limited number of computing contexts that are not workload dependent. The adaptation is largely based on the availability of an external power supply. For example, in a computing context in which a computing device (e.g., a portable computing device such as a laptop computer) is connected to an external power source, performance of the hardware processor of the device may be increased at the cost of consuming additional power regardless of workload. In a computing context in which the computing device is not connected to an external power source and operates on an internal battery, performance of the hardware processor may be reduced to conserve power again regardless of the workload at hand.

SUMMARY

In one or more example implementations, a method includes receiving, by a workload prediction system of a hardware processor, telemetry data for one or more systems of the hardware processor. The method includes determining a workload prediction by processing the telemetry data through a workload prediction model executed by a workload prediction controller of the workload prediction system. The method includes selecting a profile, from a plurality of profiles, that matches the workload prediction. The selected profile specifies one or more operating parameters for the hardware processor. The method includes providing the selected profile to a power management controller of the hardware processor for controlling an operational characteristic of the one or more other systems.

The foregoing and other implementations can each optionally include one or more of the following features, alone or in combination. Some example implementations include all the following features in combination.

In some aspects, the workload prediction specifies a candidate application likely executing in the hardware processor at a time corresponding to the telemetry data.

In some aspects, the candidate application is a particular application selected from a class of application that includes a plurality of different candidate applications.

In some aspects, the selected profile is one of a plurality of different profiles corresponding to the candidate application. Each profile of the plurality of profiles of the candidate application corresponds to a different operating state of the candidate application.

In some aspects, the method includes adjusting, by the power management controller, the operating characteristic of the one or more other systems in response to, and based on, the selected profile.

In some aspects, the receiving the telemetry data, the determining the workload prediction, the matching the workload prediction with the profile, and the providing the selected profile to the power management controller are performed in real-time.

In some aspects, the receiving the telemetry data, the determining the workload prediction, the matching the workload prediction with the profile, and the providing the selected profile to the power management controller are performed continuously.

In some aspects, the workload prediction model is a machine learning model.

In some aspects, the machine learning model is trained to select a candidate application from a plurality of candidate applications based on the telemetry data.

In some aspects, the machine learning model is further trained to select an operating state of the candidate application from a plurality of operating states for the candidate application. The selected profile further depends on the selected operating state of the candidate application.

In one or more example implementations, a hardware processor includes a system management unit. The hardware processor includes one or more systems coupled to the system management unit. The system management unit includes a workload prediction controller and a power management controller. The workload prediction controller is configured to execute operations including receiving telemetry data for the one or more systems. The workload prediction controller is configured to execute operations including determining a workload prediction by processing the telemetry data through a workload prediction model executed by the workload prediction controller. The workload prediction controller is configured to execute operations including selecting a profile, from a plurality of profiles, that matches the workload prediction. The selected profile specifies one or more operating parameters for the hardware processor. The workload prediction controller is configured to execute operations including providing the selected profile to the power management controller of the hardware processor for controlling an operational characteristic of the one or more other systems.

The foregoing and other implementations can each optionally include one or more of the following features, alone or in combination. Some example implementations include all the following features in combination.

In some aspects, the workload prediction specifies a candidate application likely executing in the hardware processor at a time corresponding to the telemetry data.

In some aspects, the application is a particular application selected from a class of application that includes a plurality of different applications.

In some aspects, the selected profile is one of a plurality of different profiles corresponding to the candidate application. Each profile of the plurality of profiles of the application corresponds to a different operating context for the application.

In some aspects, the power management controller is configured to adjust the operating characteristic of the one or more systems in response to, and based on, the selected profile.

In some aspects, the receiving the telemetry data, the determining the workload prediction, the matching the workload prediction with the profile, and the providing the selected profile to the power management controller, as performed by the workload prediction controller, are performed in real-time.

In some aspects, the receiving the telemetry data, the determining the workload prediction, the matching the workload prediction with the profile, and the providing the selected profile to the power management controller, as performed by the workload prediction controller, are performed continuously.

In some aspects, the workload prediction model is a machine learning model.

In some aspects, the machine learning model is trained to select a candidate application from a plurality of candidate applications based on the telemetry data.

In some aspects, the machine learning model is further trained to select an operating state of the candidate application from a plurality of operating states for the candidate application, and wherein the selected profile further depends on the selected operating state of the candidate application.

In one or more example implementations, a computer program product includes one or more computer readable storage mediums having program instructions embodied therewith. The program instructions are executable by computer hardware, e.g., a hardware processor, to cause the computer hardware to initiate and/or execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example implementation of the lookup table of FIG. 3.

DETAILED DESCRIPTION

Figure 1:
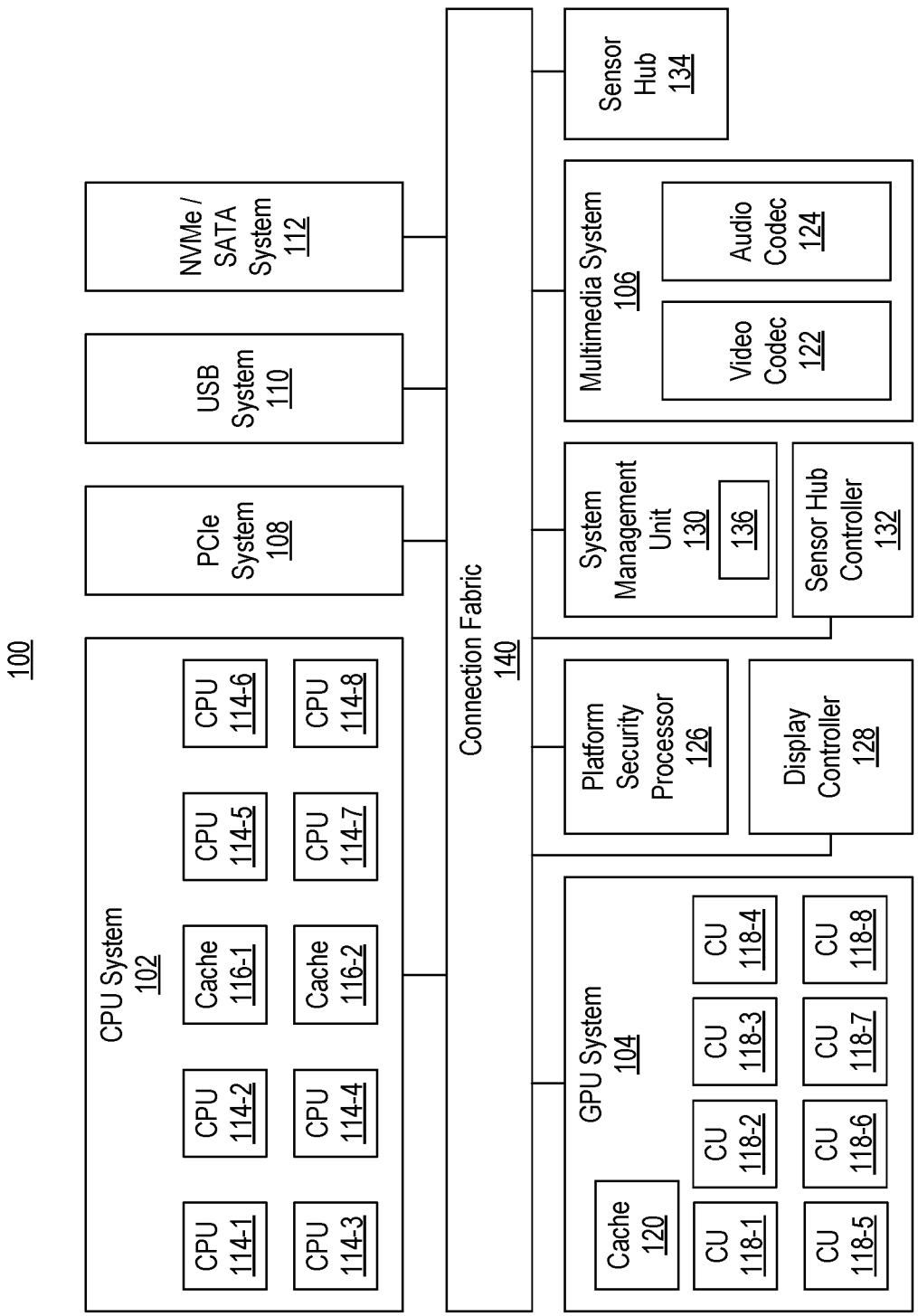
FIG. 1 illustrates an example architecture for a hardware processor including embedded workload prediction functionality.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to adapting performance of an IC based on workload predictions. In accordance with the inventive arrangements described within this disclosure, a hardware system may be included, e.g., embedded, within an IC such as a hardware processor. The hardware system so embedded may be dedicated to, and responsible for, predicting a particular workload that is currently being performed or executed by the IC. By implementing the workload prediction capability as hardware within the hardware processor itself, e.g., the IC performing the workload, the workload prediction can be rendered in less time than would otherwise be the case. Further, workload predictions can be generated continuously without placing a burden on the computational resources of the hardware processor. The workload predictions can be rendered in real-time and applied as available to better adapt the hardware processor for performing the workload at hand. This capability allows the hardware processor to adapt to changing workloads with less latency compared to other mechanisms implemented by software at the operating system level as executed by the hardware processor.

In one or more examples, a workload prediction system is included in a hardware processor. The workload prediction system receives telemetry data from one or more of the various other systems of the hardware processor. The workload prediction system is capable of executing a workload prediction model into which the telemetry data is fed as input. The workload prediction model, as executed by the workload prediction system, is capable of performing workload prediction based on an analysis of the received telemetry data.

In one aspect, the workload prediction model generates a workload prediction based on the received telemetry data. The workload prediction specifies a type (e.g., a class) of application that is considered likely executing in the hardware processor as of the time that the telemetry data used to determine the prediction was generated. Within this disclosure, it should be appreciated that a determination that a candidate application is likely executing or likely currently executing means that the application is predicted to have been executing at the time that the telemetry data relied on for the workload prediction was generated in the hardware processor. In another aspect, the workload prediction specifies a particular application, e.g., a "candidate application," selected from the application class that is considered likely executing in the hardware processor as of the time that the telemetry data used to generate the prediction was generated. It should be appreciated that the workload prediction may specify one or more different classes of applications and one or more particular candidate application(s) in each such application class for a given set of telemetry data.

In one or more other example implementations, the workload prediction model, as executed by the workload prediction system, is implemented using Artificial Intelligence. For example, the workload prediction model may be implemented as a machine learning model. The machine learning model may be generated using an off-line training process in which the machine learning model learns to determine one or more candidate applications likely executing in the hardware processor at the time the telemetry data was generated.

For each candidate application or set of candidate applications specified by the workload prediction, the workload prediction system is capable of matching the workload prediction, e.g., the determined candidate application(s), to one of a plurality of different profiles stored in the workload prediction system. Each profile may specify a plurality of different parameters that may be applied to the various system(s) of the hardware processor to enhance the performance of the hardware processor. In some cases, enhancing performance may include increasing the computational capability of the hardware processor so that users do not perceive a lag or disruption in execution of the current workload. In other examples, enhancing the performance may include decreasing the computational capability of the hardware processor by recognizing those workloads where higher levels of computational capability are not necessary to avoid user perceivable lag or disruption in execution of the current workload. In other examples, the performance of the hardware processor may be improved or optimized on a performance-per-watt consumed basis. In general, performance may be determined based on metrics such as benchmark scores, user experience (e.g., user perception of lag or slow operation of a system), and/or power drawn from and/or by a platform.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture for a hardware processor 100 including embedded workload prediction functionality. In the example, hardware processor 100 includes a central processing unit (CPU) system 102, a graphics processing unit (GPU) system 104, and a multimedia system 106. Hardware processor 100 also includes input/output (I/O) circuitry including a Peripheral Component Interconnect Express (PCIe) system 108, a Universal Serial Bus (USB) system 110, and a Non-Volatile Memory Express (NVMe)/Serial Advanced Technology Attachment (SATA) system 112.

CPU system 102 may include a plurality of CPUs (e.g., processor cores) 114 and one or more cache memories 116. GPU system 104 may include a plurality of compute units (CUs) 118 and one or more cache memories 120. Multimedia system 106 may include a video codec 122 and an audio codec 124.

As illustrated, hardware processor 100 also may include a platform security processor 126, a display controller 128, a system management unit (e.g., circuitry) 130, a sensor hub controller 132, and a sensor hub 134. Sensor hub 134 is capable of operating as a centralized interface for accessing the various sensors of the different systems of hardware processor 100. Sensor hub 134 may operate under control of sensory hub controller 132. System management unit 130 includes a workload prediction system 136.

In the example, the various systems illustrated, e.g., CPU system 102, GPU system 104, multimedia system 106, PCIe system 108, USB system 110, NVMe/SATA system 112, platform security processor 126, display controller 128, system management unit 130, sensory hub controller 132, and sensor hub 134 are coupled to connection fabric 140. Connection fabric 140 may be implemented as or include one or more communication buses, switches, and/or other types of on-chip interconnects.

As an illustrative and non-limiting example, connection fabric 140 may include one or more switches and/or interconnects that are compliant with the Advanced Microcontroller Bus Architecture (AMBA) eXtensible Interface (AXI) (hereafter "AXI") protocol. AXI defines an embedded microcontroller bus interface for use in establishing on-chip connections between compliant circuit blocks and/or systems. AXI is provided as an illustrative example of connection fabric 140 and is not intended as a limitation of the examples described within this disclosure. It should be appreciated that other similar and/or equivalent protocols, communication buses, bus interfaces, switches, interconnects and/or combinations thereof may be used in lieu of AXI and that the various example circuit blocks and/or signals provided within this disclosure will vary based on the type of connections used.

In the example, workload prediction system 136 is capable of receiving telemetry data via sensor hub 134 and connection fabric 140. Telemetry data can include, but is not limited to, sensor data as captured by various sensors on hardware processor 100 and provided to sensor hub 134. Sensors included in hardware processor 100 may include temperature sensors, voltage sensors, and/or counters. Telemetry data may include data generated by the one or more sensors. In general, the sensor data is data that may be used for power management of hardware processor 100. For example, sensor data may include counts and/or data obtained from various counters (e.g., "CAC" counters) that are used to compute quantities such as power from current, voltage, power from voltage, temperature, and/or activity of components such as the data fabric (DF), memories, cores, and/or voltage regulator(s). For example, CAC counters are capable of capturing dynamic switching capacitance such that dynamic power may be calculated as a function of CAC (e.g., $CAC*V^2$). The data fabric refers to the interconnection between cores and memory. Activity refers to measures (e.g., occupancy, capacity, and the like) of how busy a given component and/or system is relative to the capability or bandwidth of that component and/or system. In some cases, such data, e.g., sensor data, is referred to as telemetry data. Telemetry refers to the in-situ collection of measurements or other data at remote points (e.g., in an IC) and their automatic transmission to receiving equipment such as sensor hub 134.

In the example, workload prediction system 136 may receive telemetry data from time-to-time, periodically, or continuously. In one or more example implementations, workload prediction system 136 may receive telemetry data every millisecond, every N milliseconds (e.g., where N is an integer value of two or more), or in sub-millisecond intervals. By including workload prediction system 136 within hardware processor 100 and/or within system management unit 130, workload prediction system 130 is able to gain access to more robust (e.g., more accurate and/or more detailed) information as to the operating status of the various systems, which may include those described herein and/or any particular Intellectual Property (IP) cores of hardware processor 100. It should be appreciated that the term system, as applied to components and/or circuitry within hardware processor 100, is intended to cover or include IP cores that may be included in hardware processor 100. The quality of telemetry data available to workload prediction system 136, for example, may be better than the quality of data typically made available by way of drivers to an operating system executed by hardware processor 100 or another entity that exists external to hardware processor 100.

For example, telemetry data as received by workload prediction system 136 may be received more frequently and with less latency than telemetry data provided to an operating system by way of drivers in a computing system. While drivers may detect workload information for a given hardware processor, any decisions made as to adapting the performance of the hardware processor based on decisions made by drivers may be affected by significant latency. The signal handshaking and Direct memory Access (DMA) transfers necessary to move the telemetry data to the drivers may incur significant delay. This means that any decisions made by in this manner may not be timely, may not reflect the current or real-time operating status of the hardware processor, and, in some cases, worsen performance of the hardware processor. Moreover, drivers and other software executing at higher levels in the computing system may be more prone to crashes than dedicated hardware/firmware embedded in the hardware processor itself and may not be functional to make decisions with respect to workload adaptation.

Workload prediction system 136 addresses these issues by generating workload predictions in less time than would be the case were workload predictions made at the driver and/or operating system level. Moreover, in many cases, telemetry data that may be output from a hardware processor may not include data from one or more of the systems or IP cores included therein. Some telemetry data may not be shared outside of the hardware processor to avoid overwhelming the recipient with too much data and/or to avoid exposing and/or revealing sensitive/confidential workings of the hardware processor to external actors. This means that drivers and/or the operating system often make decisions with incomplete telemetry data.

FIG. 1 is provided for purposes of illustration and not limitation. FIG. 1 is illustrative of a type of hardware processor architecture in which a workload prediction system as described herein may operate. It should be appreciated that the particular IC and/or hardware processor in which a workload prediction system may be included may have additional systems (e.g., programmable logic and/or a data processing array) or fewer systems than shown. As noted, IP cores included in an IC may be considered systems of the IC. Further, the particular systems included in hardware processor 100 may differ from those illustrated. In addition, of those particular systems illustrated, such systems may include fewer or more constituent components (e.g., CPUs, decoders, CUs, etc.).

Figure 2:
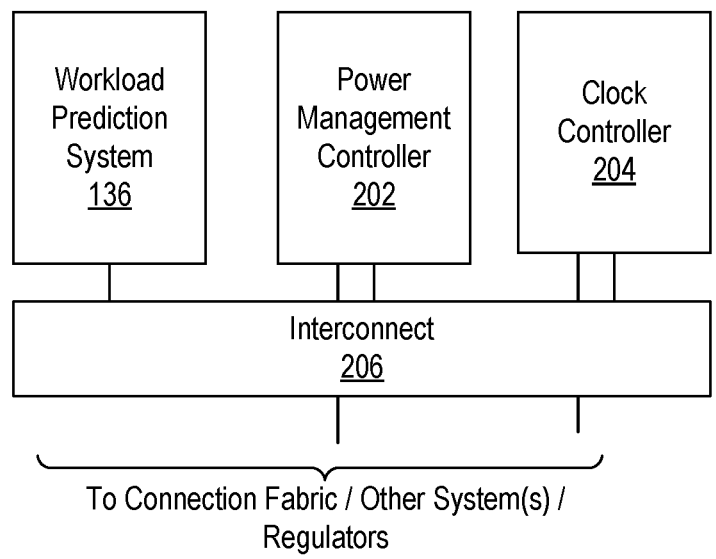
FIG. 2 illustrates an example implementation of the system management system of FIG. 1.

FIG. 2 illustrates an example implementation of system management unit 130 of FIG. 1. As illustrated, system management unit 130 includes workload prediction system 136, a power management controller 202, and a clock controller 204. System management unit 130 may include one or more additional controllers (not shown) for controlling various other aspects of hardware processor 100. For purposes of illustration, power management controller 202 may control voltage levels of power signals provided to the various systems (e.g., on a per system and/or power domain basis) of hardware processor 100. Clock controller 204 is capable of controlling the frequency of clock signals distributed to the various systems of hardware processor 100 (e.g., on a per system and/or clock domain basis). Clock controller 204 may operate under control of power management controller 202.

For example, power management controller 204 is capable of instructing clock controller 204 to increase, decrease, or leave constant the frequency of one or more of the various clock signals distributed to the various systems of hardware processor 100. Accordingly, power management controller 202 is capable of controlling voltage signals and clock signals provided to various systems of hardware processor 100 including, but not limited to, CPU system 102 (e.g., to one or more CPUs 114), GPU system 104 (e.g., one or more CUs 118), and/or on-chip memory of hardware processor 100 (not shown).

In the example, workload prediction system 136, power management controller 202, and clock controller 204 may communicate over an interconnect 206 that is included in system management unit 130. Interconnect 206 implements an interface between system management unit 130, CPUs 114, CUs 118, on-chip memory, and graphics (e.g., video codec 122, display controller 128, and/or GPU system 104). In one or more other example implementations, one or more of workload prediction system 136, power management controller 202, and clock controller 204 may communicate via direct links or interconnects (not shown). Power management controller 202 and clock controller 204 also may couple to other components whether directly or through connection fabric 140. For example, power management controller 202 may be coupled to one or more voltage regulators thereby enabling power management controller 202 to adjust the level of voltage provided to the various different systems of hardware processor 100. Power management controller 202 may provide instructions to clock controller 204 to vary the frequency of clock signals. Accordingly, responsive to instructions from power management controller 202, clock controller 204 may control different clock sources (e.g., PLLs, clock generators, etc.).

In the example, workload prediction system 136 is capable of processing received telemetry data. Based on the telemetry data, workload prediction system 136 generates a workload prediction. Workload prediction system 136 is capable of selecting a profile corresponding to the workload prediction and providing the profile to power management controller 202. Power management controller 202 may execute firmware for managing power related functions of hardware processor 100 such as regulating voltage and/or clock frequencies. Power management controller 202, based on, and in response to, the received profile, determines whether to leave voltage(s) unchanged, increase voltage(s), decrease voltage(s), leave clock frequenc(ies) unchanged, increase clock frequenc(ies), and/or decrease clock frequenc(ies) for the various systems included in hardware processor 100. As noted, such adjustments may be made on a per-system basis.

Figure 3:
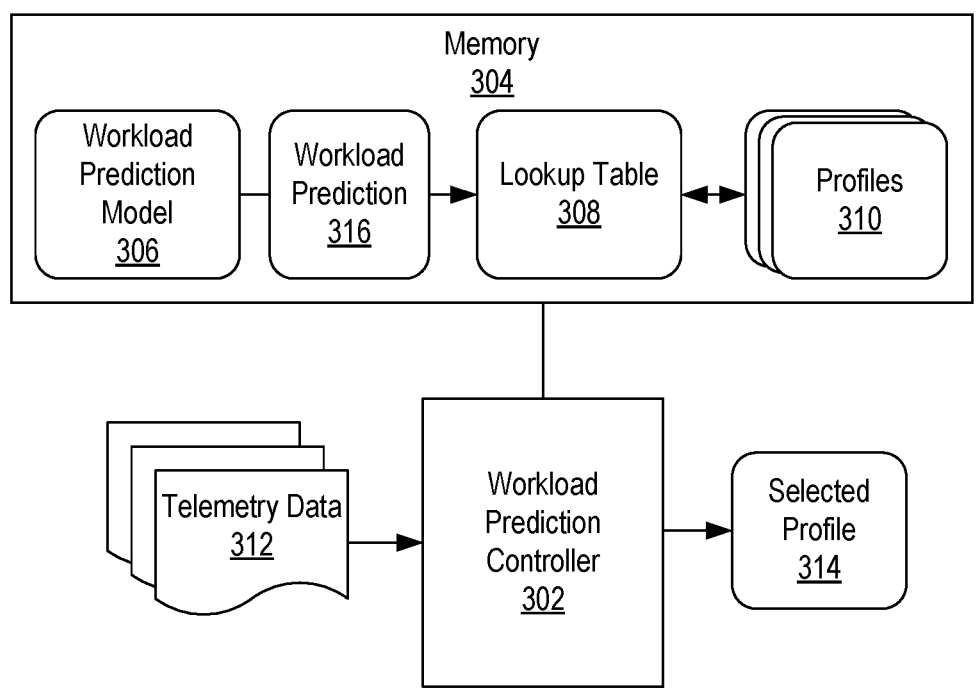
FIG. 3 illustrates an example implementation of the workload prediction system of FIG. 1.

FIG. 3 illustrates an example implementation of workload prediction system 136. In the example, workload prediction system 136 includes a workload prediction controller 302 coupled to a memory 304. Memory 304 may be implemented as a random-access memory. In the example, memory 304 stores a workload prediction model 306 (e.g., computer-readable program instructions), a lookup table 308, and a plurality of profiles 310.

In one or more examples, workload prediction model 306 is executable by workload prediction controller 302. Inputs to workload prediction model 306 include telemetry data 312. Workload prediction model 306 may be implemented as an AI model. For example, workload prediction model 306 may be implemented and/or created using machine learning. Workload prediction model 306 receives telemetry data 312, uses telemetry data 312 to perform inference processing, and determines a workload prediction 316.

Workload prediction 316 may specify not only a class of application that is likely executing in hardware processor 100, but also an estimate of the particular application or applications (e.g., referred to herein as a candidate application or candidate applications) likely executing in hardware processor 100 as of the time that telemetry data 312 was generated. For example, workload prediction model 306 may be created through supervised learning performed using a data processing system (e.g., a computer) where training data specifying telemetry data for known operating contexts in which a particular application or applications are executing is labeled as such. For purposes of illustration and not limitation, workload prediction model 306 may be created using a platform such as TensorFlow® Lite or another suitable machine learning model generation platform. The resulting machine learning models are lightweight and may be executed by a controller that may have reduced computational power relative to a CPU and/or other processor such as a GPU. In the example described herein, the resulting model may be executed by a dedicated controller embedded in a larger hardware processor.

In one or more examples, workload prediction model 306 also may be trained to detect particular operating states for the candidate application(s). For purposes of illustration, consider a candidate application such as a web-conferencing application. Such a candidate application is capable of conducting voice communication, video communication, screen sharing, chat, document sharing, and/or other functionality. In the case where workload prediction 316 predicts that a particular web-conferencing application is executing, workload prediction model 306 also may be trained to determine the operating state of that web-conferencing application. That is, workload prediction 316 may include a prediction as to whether the web-conferencing application is conducting a voice only communication or call, conducting only chats (e.g., text chats), conducting video communication, or some combination of the available functions provided by the web-conferencing application. In this example, workload prediction model 306 may be created through supervised learning where the training data, in addition to what has been described, also corresponds to different operating states for the various candidate applications and is labeled with such different operating states.

Workload prediction controller 302 uses the workload prediction to index into lookup table 308. Lookup table 308 stores a listing of workload predictions correlated with profiles 310. For example, each workload prediction that may be generated by workload prediction model 306 may be paired with a particular profile. Each of profiles 310 specifies one or more parameters that may be provided to power management controller 202. The parameters may be used by power management controller 202 to control voltage and/or clock frequency in hardware processor 100. As noted, voltage and clock frequency may be controlled on a per-system basis.

In one aspect, the parameters may be coefficients that are utilized by power management controller 202 in determining whether and/or how much to adjust voltage levels and/or clock frequencies in hardware processor 100 for one or more different systems. As noted, power management controller 202 may execute firmware (e.g., computer-readable program instructions) and the parameters specified by selected profile 314 may be coefficients that are provided as input(s) to the firmware. In any case, having determined workload prediction 316 and matched workload prediction 316 to a selected profile 314, workload prediction controller 302 is capable of outputting selected profile 314 to power management controller 202.

FIG. 4 illustrates an example implementation of lookup table 308 of FIG. 3. In the example, lookup table 308 specifies the class of application (e.g., a type such as game, word processor, spreadsheet, conferencing, browser, etc.), a particular application of the class (e.g., the particular application make, name, and/or version), optionally an operating state for one or more of the different applications, and a profile. For purposes of illustration, it can be seen that the class of application "web-conferencing" has two different and particular web-conferencing applications that may be candidate applications. Further, the candidate application Web-conferencing-1 has two possible operating states. The candidate application Web-conferencing-2 has one possible operating state. As shown, a different profile may be specified for each different candidate application and/or for each different candidate application in a same class of application. Further, a different profile may be specified for each different operating state of a same candidate application. Appreciably, different profiles may specify different values for the various parameters included therein.

Figure 5:
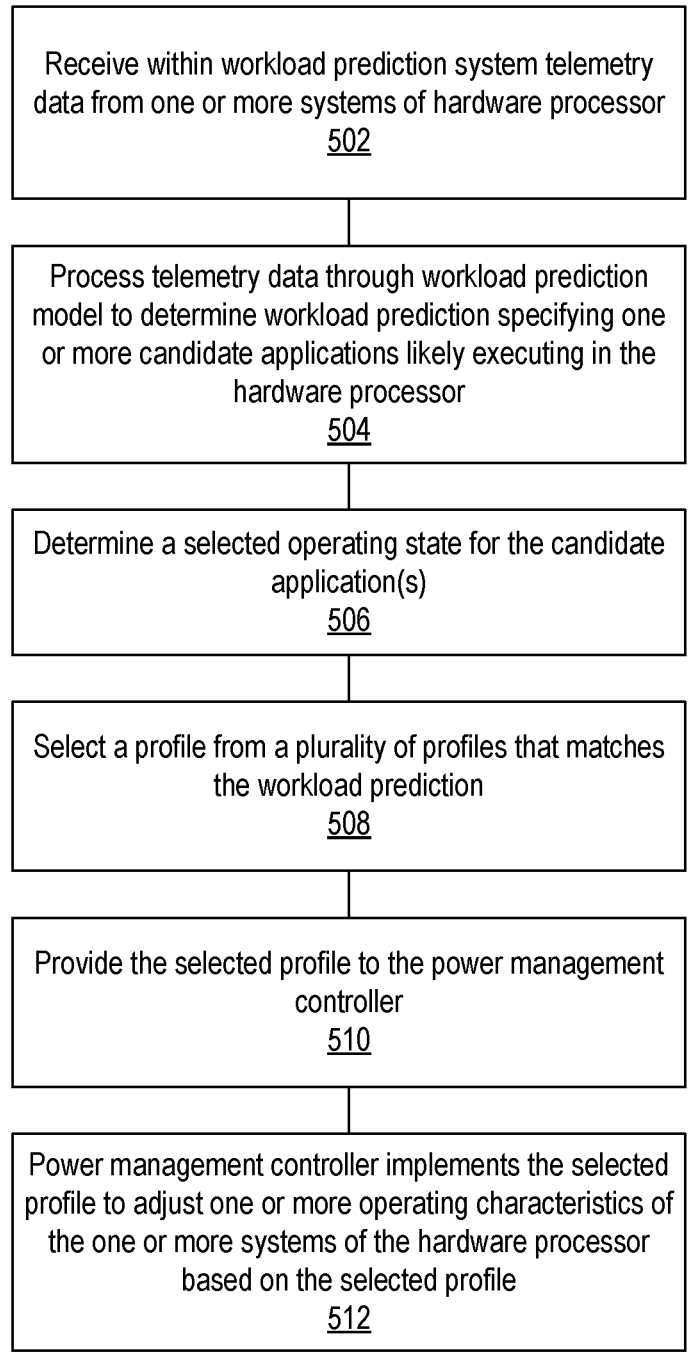
FIG. 5 illustrates an example method of operation for an integrated circuit (IC) including an embedded workload prediction system.

FIG. 5 illustrates an example method 500 of operation for an IC such as a hardware processor including an embedded workload prediction system. Method 500 may be implemented by workload prediction system 136 embedded in an IC as described herein. As noted, workload prediction system 136 may be implemented as dedicated hardware for performing workload prediction.

In block 502, workload prediction system 136 receives telemetry data 312 for one or more systems of hardware processor 100. For example, telemetry data 312 pertaining to one or more systems of hardware processor 100 may be provided to workload prediction controller 302.

In block 504, workload prediction controller 302 processes the received telemetry data 312 through workload prediction model 306 to determine workload prediction 316. Workload prediction 316 specifies one or more candidate applications (e.g., particular applications) likely executing in hardware processor 100. For example, received telemetry data 312 is provided as input to workload prediction model 306. Workload prediction model 306 performs inference processing and outputs workload prediction 316 that specifies one or more candidate applications. Each candidate application specified is an application that workload prediction controller 302 has determined was likely executing in hardware processor 100 as of, or at, the time that the telemetry data 312 was generated or captured.

In block 506, workload prediction controller 302 optionally determines a selected operating state from a plurality of possible operating states for the candidate application. In one or more example implementations, workload prediction model 306 not only predicts one or more candidate applications to be currently executing in hardware processor 100, but also predicts a likely operating state for each such candidate application.

In block 508, workload prediction controller 302 selects a profile 314 from a plurality of profiles 310 that matches workload prediction 316. For example, given a workload prediction 316 specifying one or more candidate applications and optionally operating states for the respective candidate application(s), workload prediction controller 302 is capable of matching the workload prediction 316 with a selected profile 314. As noted, in one aspect, workload prediction controller 302 may perform the matching using lookup table 308.

In block 510, workload prediction controller 302 is capable of providing selected profile 314 to power management controller 202. In block 512, power management controller 202, in response to receiving selected profile 314, is capable of implementing selected profile 314. For example, in response to receiving selected profile 314, power management controller 202 is capable of using the parameters specified by selected profile 314 to determine one or more target operating characteristics for hardware processor 100. Power management controller is capable of adjusting the one or more operating characteristics of the one or more systems of hardware processor 100 based on (e.g., to conform with) the target characteristics determined using selected profile 314. The one or more operating characteristics may include, but are not limited to, one or more of voltage of power signals and/or frequencies of clock signals within hardware processor 100. As noted, the operating characteristics may be adjusted on a per-system basis. For example, the frequency of clock signals and/or voltage of power signals may be maintained or adjusted for one or more of the CPUs 114, CUs 118, on-chip memories, codecs (e.g., multimedia system 106), and/or any of the various I/O systems (e.g., PCIe system 108, USB system 110, and/or NVMe/SATA system 112).

In one or more examples, the operations described in FIG. 5 may be performed in real-time. Further, one or more or all of the operations described in FIG. 5 may be performed continuously (e.g., in sub-millisecond intervals, each millisecond, or every N milliseconds).

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one hardware processor programmed to initiate operations and memory.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a workload prediction system of a hardware processor embodied as an integrated circuit, telemetry data for one or more systems of the hardware processor;
   determining a workload prediction by processing the telemetry data through a workload prediction model executed by a workload prediction controller of the workload prediction system, wherein the workload prediction controller is embodied as a hardware controller embedded in the integrated circuit and dedicated to performing workload prediction;

selecting a profile, from a plurality of profiles, that matches the workload prediction, wherein the selected profile specifies one or more operating parameters for the hardware processor; and providing the selected profile to a power management controller of the hardware processor for controlling an operational characteristic of the one or more systems.

2. The method of claim 1, wherein the workload prediction specifies a candidate application likely executing in the hardware processor as of a time corresponding to the telemetry data.

3. The method of claim 2, wherein the candidate application is a particular application selected from a class of application that includes a plurality of different candidate applications.

4. The method of claim 2, wherein the selected profile is one of a plurality of different profiles corresponding to the candidate application, wherein each profile of the plurality of profiles of the application corresponds to a different operating state of the candidate application.

5. The method of claim 1, further comprising:
adjusting, by the power management controller, the operating characteristic of the one or more systems in response to, and based on, the selected profile.

6. The method of claim 1, wherein the receiving the telemetry data, the determining the workload prediction, the matching the workload prediction with the profile, and the providing the selected profile to the power management controller are performed in real-time.

7. The method of claim 1, wherein the receiving the telemetry data, the determining the workload prediction, the matching the workload prediction with the profile, and the providing the selected profile to the power management controller are performed continuously.

8. The method of claim 1, wherein the workload prediction model is a machine learning model.

9. The method of claim 8, wherein the machine learning model is trained to select a candidate application from a plurality of candidate applications based on the telemetry data.

10. The method of claim 9, wherein the machine learning model is further trained to select an operating state of the candidate application from a plurality of operating states for the candidate application, and wherein the selected profile further depends on the selected operating state of the candidate application.

11. A hardware processor, comprising:
a system management unit; and
one or more systems coupled to the system management unit;
wherein the hardware processor is embodied as an integrated circuit; and
wherein the system management unit includes:
a workload prediction controller embodied as a hardware controller embedded in the integrated circuit and dedicated to performing workload prediction; and
a power management controller;
wherein the workload prediction controller is configured to execute operations including:
receiving telemetry data for the one or more systems;
determining a workload prediction by processing the telemetry data through a workload prediction model executed by the workload prediction controller;
selecting a profile, from a plurality of profiles, that matches the workload prediction, wherein the selected profile specifies one or more operating parameters for the hardware processor; and
providing the selected profile to the power management controller of the hardware processor for controlling an operational characteristic of the one or more systems.

12. The hardware processor of claim 11, wherein the workload prediction specifies a candidate application likely executing in the hardware processor as of a time corresponding to the telemetry data.

13. The hardware processor of claim 12, wherein the candidate application is a particular application selected from a class of application that includes a plurality of different candidate applications.

14. The hardware processor of claim 12, wherein the selected profile is one of a plurality of different profiles corresponding to the candidate application, wherein each profile of the plurality of profiles of the candidate application corresponds to a different operating state of the candidate application.

15. The hardware processor of claim 11, wherein the power management controller is configured to adjust the operating characteristic of the one or more systems in response to, and based on, the selected profile.

16. The hardware processor of claim 11, wherein the receiving the telemetry data, the determining the workload prediction, the matching the workload prediction with the profile, and the providing the selected profile to the power management controller, as performed by the workload prediction controller, are performed in real-time.

17. The hardware processor of claim 11, wherein the receiving the telemetry data, the determining the workload prediction, the matching the workload prediction with the profile, and the providing the selected profile to the power management controller, as performed by the workload prediction controller, are performed continuously.

18. The hardware processor of claim 11, wherein the workload prediction model is a machine learning model.

19. The hardware processor of claim 18, wherein the machine learning model is trained to select a candidate application from a plurality of candidate applications based on the telemetry data.

20. The hardware processor of claim 19, wherein the machine learning model is further trained to select an operating state of the candidate application from a plurality of operating states for the candidate application, and wherein the selected profile further depends on the selected operating state of the candidate application.

* * * * *